(12) United States Patent
Santos et al.

(10) Patent No.: US 6,702,360 B1
(45) Date of Patent: Mar. 9, 2004

(54) TONNEAU COVER MOUNTING MECHANISM

(75) Inventors: Jose Ramon Santos, Buena Park, CA (US); Henry Giovanny Velasquez, Pico Rivera, CA (US)

(73) Assignee: Custom Fibreglass Manufacturing Co., Long Beach, CA (US)

( * ) Notice: Subject to any disclaimer, the term of this patent is extended or adjusted under 35 U.S.C. 154(b) by 0 days.

(21) Appl. No.: 10/336,257

(22) Filed: Jan. 3, 2003

(51) Int. Cl.[7] .................................................. B60P 7/02
(52) U.S. Cl. ........................ 296/100.07; 296/100.02; 296/100.06; 296/100.08; 296/100.1
(58) Field of Search .................. 296/100.01, 100.02, 296/100.06, 100.07, 100.08, 100.09, 100.1, 136.03; 180/69.21; 16/250, 368

(56) References Cited

U.S. PATENT DOCUMENTS

| | | |
|---|---|---|
| 2,989,340 A | 6/1961 | Penner |
| 3,704,039 A | 11/1972 | Dean |
| 3,762,762 A * | 10/1973 | Beveridge et al. ........ 296/100.1 |
| 4,101,162 A | 7/1978 | Koehn |
| 4,124,247 A | 11/1978 | Penner |
| 4,762,360 A | 8/1988 | Huber |
| 5,632,522 A | 5/1997 | Gaitan et al. |
| 5,957,525 A | 9/1999 | Nelson |
| 5,971,446 A * | 10/1999 | Lunney, II ............. 296/100.08 |
| 6,254,169 B1 * | 7/2001 | Arthur .................... 296/100.07 |
| 6,290,441 B1 * | 9/2001 | Rusu ..................... 296/100.07 |
| 6,309,005 B1 * | 10/2001 | Priest et al. ........... 296/100.06 |
| 6,343,828 B1 * | 2/2002 | Young et al. ............ 296/100.1 |
| 6,427,500 B1 * | 8/2002 | Weinerman et al. ....... 296/37.6 |
| 6,447,045 B1 * | 9/2002 | Dickson et al. ........ 296/100.08 |
| 6,497,445 B1 * | 12/2002 | Combs, II .............. 296/100.07 |
| 6,520,558 B1 * | 2/2003 | Katterloher et al. ... 296/100.06 |
| 6,565,141 B1 * | 5/2003 | Steffens et al. ........ 296/100.07 |

* cited by examiner

Primary Examiner—D. Glenn Dayoan
Assistant Examiner—Greg Blankenship
(74) Attorney, Agent, or Firm—Fulwider Patton Lee & Utecht, LLP

(57) ABSTRACT

A hard tonneau cover includes a hinging mechanism that relies on a compound hinge to control the position of the front of the cover yet allows the cover to be easily removed from the cargo bed. The compound hinge includes a hinge plate that is slidingly received in a hinge pocket that is attached to the cargo bed. A locking mechanism serves to pop the rear edge of the cover off of the tailgate upon being unlocked so as to allow the rear edge to more easily be grasped and pivoted toward its open position. The hinge pocket, strike loop of the locking mechanism and a telescoping strut are all attached to a common bracket that is attached to the cargo box.

12 Claims, 3 Drawing Sheets

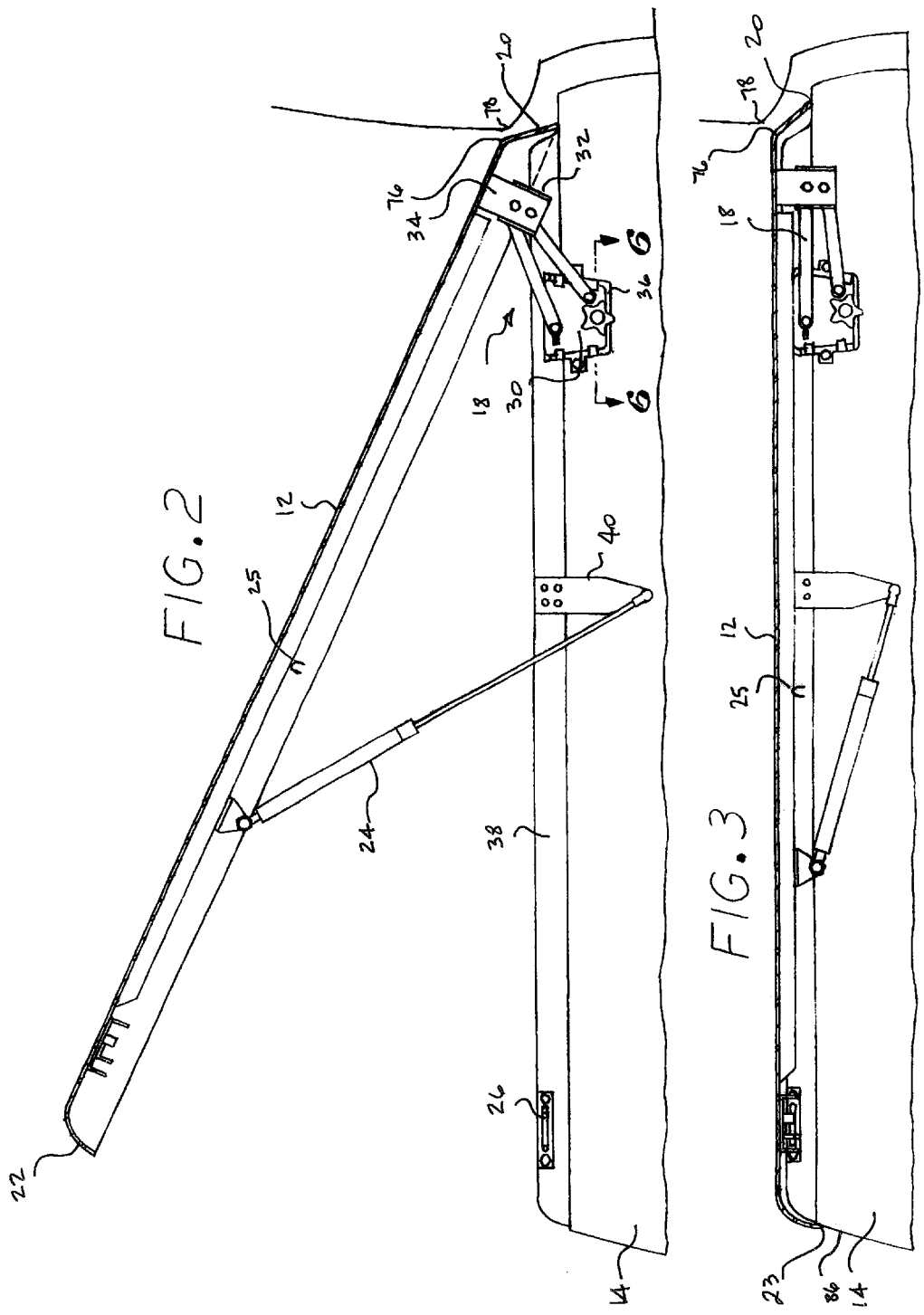

TONNEAU COVER MOUNTING MECHANISM

BACKGROUND OF THE INVENTION

The present invention generally relates to the mounting of a hard tonneau cover for pickup truck and more particularly pertains to the mechanism for hinging and securing such devices to the cargo box.

As more and more pickup trucks are being purchased and used as primary transportation, items often end up being carried in the cargo box that should more properly be secured from theft and protected from the elements. Tonneau covers, especially hard tonneau covers afford such protection and security and additionally enhance fuel mileage by smoothing out the air flow over the rear part of the vehicle. Additionally, many find an aesthetic appeal in covering up the cargo box of a pickup truck.

Hard tonneau covers are typically constructed of fiber reinforced resin, have a high quality finish to match the rest of the vehicle and form a weather tight seal about the top of the cargo box's sidewalls when in the closed position. The covers are typically hinged at the front so as to allow the back to be pivoted upwardly and are latched and lockable at the rear. Telescoping gas struts are used to assist in lifting the cover and to then maintain it in its open position.

A difficulty associated with the adaptation of a hard tonneau cover to many truck applications is related to the hinging of the front end of the cover. While it is desirable to wrap the cover over the edges of the truck's cargo box, including over the front rail, in order to provide a clean appearance and so as to hide unsightly hinging hardware while the cover is in its closed position, the typical close proximity of the front of the bed to the back of the truck cab is problematic as the cover is pivoted to its open position. This problem is further aggravated in some truck designs wherein the front edge of the truck's cargo box has a non-square configuration that partially follows the contours of the back of the truck cab. While compound hinges can be configured to force the front edge of the cover to follow a complex path so as to clear the cab, the use of such hinges can compromise the ability to quickly and easily remove the cover from the truck when full access to the cargo bed is required such as when hauling oversized cargo. Compound hinges typically have multiple links as well as other hinge components that require partial disassembly in order to allow the cover to be detached.

An additional problem associated with many presently available hard tonneau cover devices is that the geometry of the gas strut mechanism that is used to assist in lifting the cover and propping it open is such that an insufficient amount of lifting force is available while the cover is in its closed position to unlatch the locking mechanism once it is unlocked. As a result, a rather cumbersome manipulation is required in an effort to simultaneously unlock the cover while attempting to grasp the rear edge of the cover to lift it. This is especially problematic in tonneau designs that wrap over the tailgate which avail only a very thin edge for grasping. The typical locking mechanism that is used in such applications precludes simply unlocking the cover and then using both hands to grasp and lift the edge of the cover as the weight of the cover will cause the cover to automatically relatch itself as soon as the lock is released.

It is therefore desirable to provide a tonneau cover hinging mechanism that forces the front edge of the cover to follow a complex path as it is opened so as to clear the back of the truck cab, yet allows the cover to be quickly and easily detached from the truck. Additionally, it is most desirable to provide a locking mechanism that allows the cover to be more easily opened.

SUMMARY OF THE INVENTION

The present invention provides a hard tonneau cover that is hinged near its front end by a compound hinge mechanism that controls the position of the front edge as the rear end of the cover is pivoted to its open position yet allows the cover to be quickly and easily removed. This allows the front edge of the cover to avoid interference with the truck cab despite a close proximity thereto even when the front edge is configured to partially wrap over the front top rail of the truck's cargo bed. The cover is removable from the cargo bed without the use of tools and the hinge mechanism is completely hidden from view when the cover is in its closed position. Additionally, the cover is secured in its closed position by a locking mechanism that serves to pop the rear edge upwardly upon being unlocked so as to more easily allow the cover to be grasped and pivoted into its open position. The locking mechanism is accessed via a single, centrally located keyhole and may additionally be activated electronically via a remote sending unit.

The hinging mechanism includes a compound hinge positioned on each side of the cover wherein each hinge employs two links. The links are each pivotably attached to a first hinge plate that is attached to the truck bed and to a second hinge plate that is attached to the cover. The links are of unequal length and the pivot points are spaced and positioned on the brackets such that the hinge plate is forced to simultaneously move slightly upwardly and rotate while the front edge of the cover shifts slightly rearwardly as the cover is pivoted to its open position. The hinge plate that is attached to the truck is configured to be slidingly received in a pocket that is affixed to the truck. Once fully received in the pocket, a rotatable set knob positively fixes the hinge plate in place. Removal of the cover is therefore easily accomplished by simply unthreading and removing the set knob from the lifting mechanism and lifting the cover off of the truck.

The locking mechanism includes a pair of latch elements that are attached on opposite sides of the cover so as to engage a strike loop affixed to each side of the truck. A spring-loaded cam lever lifts the latching element clear of the strike loop as the mechanism is unlatched either by rotation of a key or by energization of a solenoid. Locking the cover merely requires the cover to be pushed downwardly with sufficient force to overcome the force of the cam lever and to trip the latch mechanism.

Telescoping gas struts are relied upon to assist in pivoting the cover into its open position and support the cover while in its open position. The gas struts are pivotally attached to the truck at one end and to the cover at its opposite end. The gas strut is easily detached from the truck-end pivot point while a retention clip is provided on the inside surface of the cover to capture the free end of each of the detached struts to ease the handling of cover during its removal from the truck bed. One hinge plate receiving pocket, one truck-end strut pivot and one strike loop may be attached to a single top rail bracket that extends along the top rail of the truck which in turn may be clamped to the truck rail.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 2 is a cross-sectional view taken along lines 2—2 of FIG. 1;

FIG. 3 is a cross-sectional view of the device shown in FIGS. 1 and 2 but with the cover in its closed position;

DETAILED DESCRIPTION OF A PREFERRED EMBODIMENT

Figure 1:
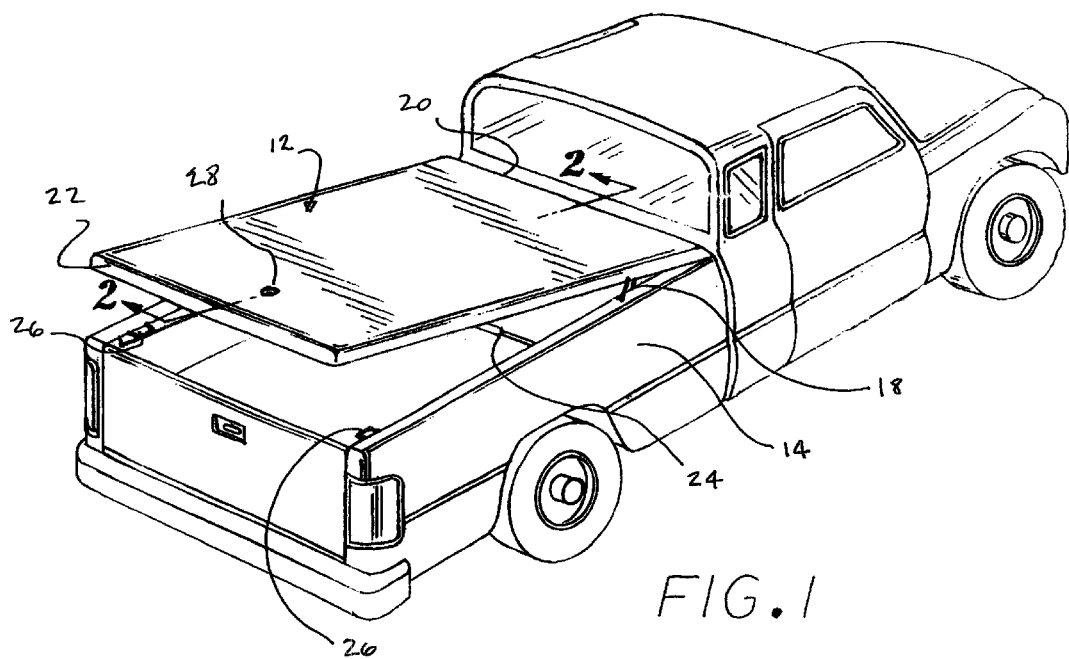
FIG. 1 is a perspective view showing the hard tonneau cover of the present invention installed on a truck bed in its open position.

The Figures generally illustrate a preferred embodiment of the present invention. As is illustrated in FIG. 1, the hard tonneau cover 12 is attached to the cargo box 14 of a pickup truck 16. The cover is hinged near the front of the box to allow the cover to pivot to the open position that is illustrated. Compound hinges 18 control the position of the front edge 20 of the cover, the rear edge 22 of the cover is lockable to the truck and telescoping gas struts 24 support the cover while in it open position. A locking mechanism that includes latching elements that engage strike loops 26 located on each side of the cargo box is actuated by a single, centrally located keyhole 28.

FIG. 2 is a cross-sectional view taken along lines 2—2 of FIG. 1. The compound hinge 18 extends between the cover 12 and the cargo box 14. More particularly, the hinge includes a first hinge plate 30 that is attached to the top rail of the cargo box and a second hinge plate 32 that is attached to cover. The second hinge plate 32 may be bolted to a bracket 34 that is in turn attached to or embedded in the cover. The first hinge plate 30 is received in a hinge pocket 36 that is attached to a top rail bracket 38. The telescoping strut 24 is pivotally attached to the cover at one end and pivotally attached to the strut mounting bracket 40 at its opposite end. A retention clip 25 is provided for retaining the strut against the cover open detachment of its truck-end. The top rail bracket 38 extends along the length of the cargo bed's top rail and may additionally have the strut mounting bracket 40 as well as the strike loop 26 attached hereto. Such configuration simplifies initial installation of the cover supporting hardware on the cargo box as the relative positions of the hinge pocket, strut bracket and strike loop are substantially fixed. The top rail bracket 38 may be clamped to the top rail to obviate the need to drill holes in the cargo bed to accommodate fasteners. The clamping system may comprise the system shown and described in U.S. Pat. No. 6,109,681 which is incorporated herein by reference in its entirety.

FIG. 3 illustrates the cover 12 in its closed position. A substantially weather tight seal is formed about the entire periphery of the cargo bed and the entire hinge mechanism 18 is hidden from view.

Figure 6:
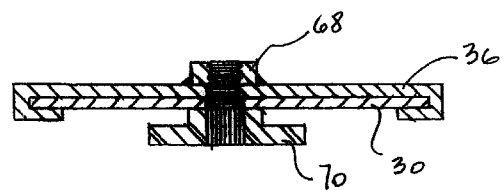
FIG. 6 is a cross-sectional view of the hinging mechanism taken along lines 6—6 of FIG. 2
Figure 4:
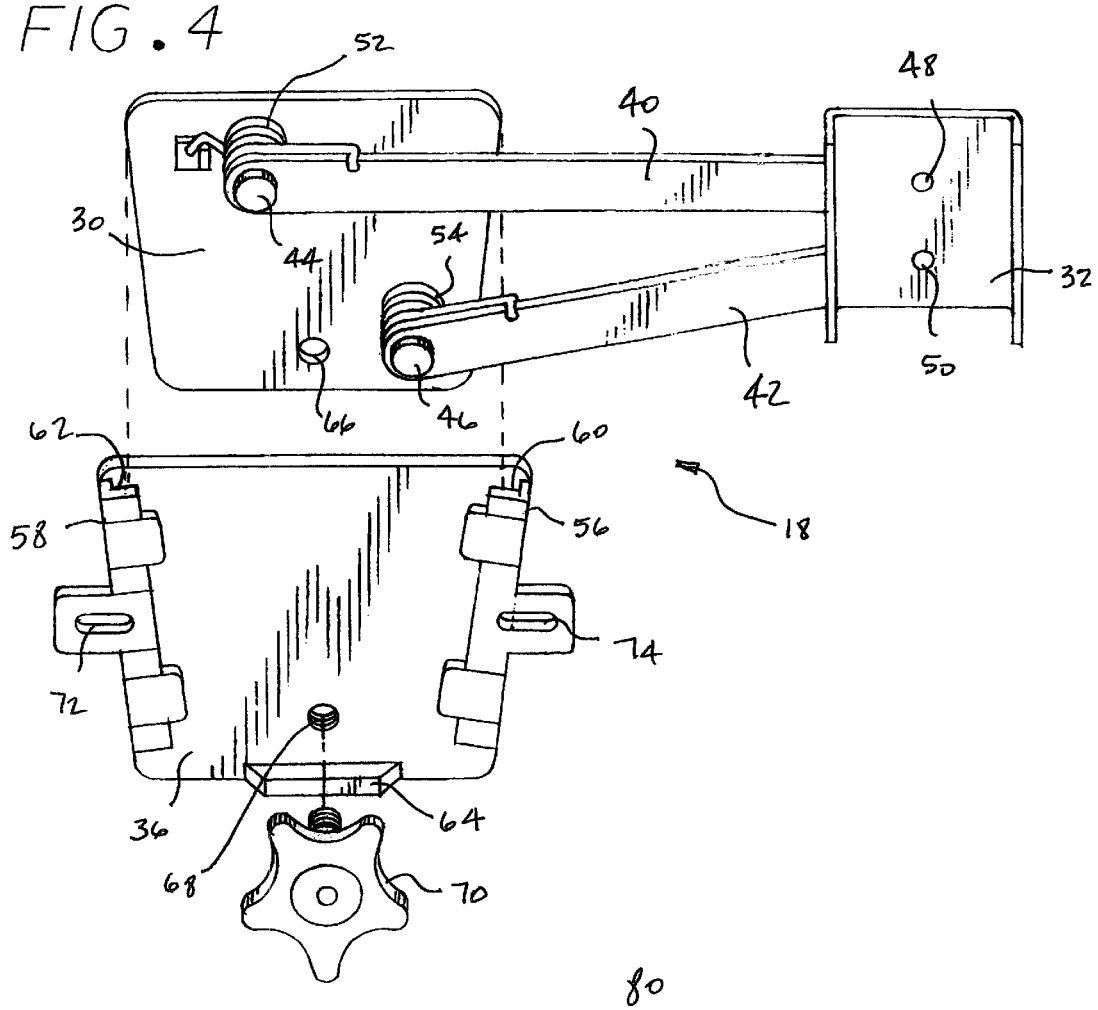
FIG. 4 is an exploded perspective view of the hinging mechanism.

FIG. 4 is an exploded view of the hinging mechanism 18. The two links 40, 42 extend between the first hinge plate 30 and the second hinge plate 32. Each link is pivotally attached to a hinge plate at each end. The links are of unequal lengths and the pivot points 44, 46 and 48, 50 are arranged so as to cause the second hinge plate 32 to rotate slightly as it is pivoted about the first hinge plate 30. Springs 52 and 54 are disposed about the first hinge plate pivot points 44, 46 to preload the mechanism slightly to facilitate alignment of the hinge plate and hinge pocket during removal and replacement of the cover on the truck. The hinge pocket 36 is dimensioned to receive and retain the first hinge plate 30. The lateral edges 56, 58 are configured to define receiving grooves 60, 62 which guide the lateral edges of the hinge plate 30 into the pocket and then retain them in place. Both the hinge pocket as well as the hinge plate have a trapezoidal shape. A stop element 64 extends from the bottom edge of the pocket to limit the depth to which the hinge plate can be inserted into the pocket. Once fully inserted, a hole 66 formed in the hinge plate becomes aligned with a threaded boss 68 formed in the hinge pocket. Threaded set knob 70 may then be threaded into place and tightened to secure the hinge pocket as is shown in the cross-sectional view shown in FIG. 6. The hinge pocket 36 is attached to the top rail bracket 38 with fasteners that extend through slotted holes 72, 74 that allow for slight fore and aft adjustment.

In use, the hinging mechanism 18 forces the front edge of the cover to shift slightly rearwardly as can be seen by comparing FIG. 2 to FIG. 3. As the rear edge of the cover is lifted upwardly, the second hinge plate 32 and hence bracket 34 moves upwardly slightly and rotates slightly to cause the front top periphery 76 of the cover to clear the rearmost periphery 78 of the truck cab. Removal of the cover from the truck bed first requires the truck-end of each strut 24 to be disconnected from the respective strut bracket which typically calls for the removal of a retaining clip or merely a sharp wrap in a lateral direction to pop the strut end of a spherical joint. The struts are then pivoted against the cover where they are each retained in place by a retention clip 25. Knobs 70 are then removed from both hinging mechanisms 18 after which the cover can simply be lifted off of the truck bed. Re-attachment of the cover calls for the reverse of the removal process.

Figure 5:
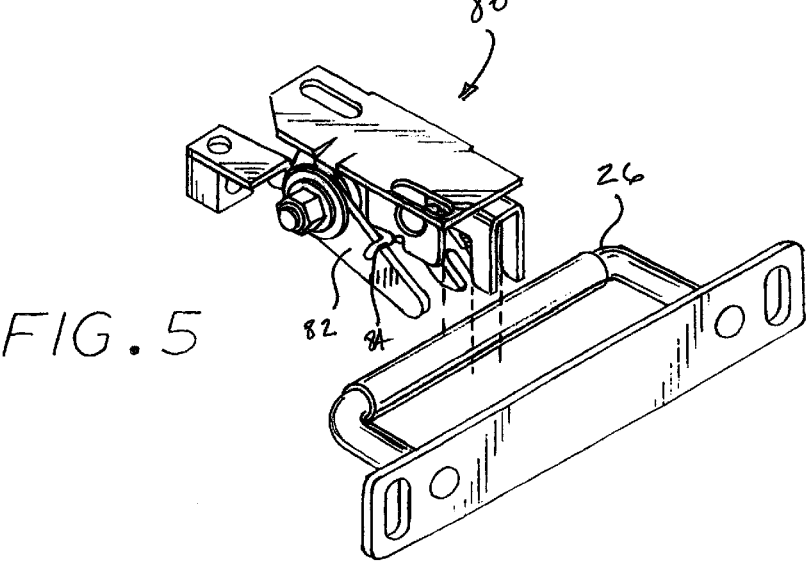
FIG. 5 is a perspective view of the locking mechanism.

FIG. 5 provides a perspective view of the latching element 80 of the locking mechanism. A spring-loaded cam lever 82 is provided to bear against the strike loop 26. The force of the tension spring 84 is sufficient to lift the latch clear of the strike loop once the latch is tripped by action of a pull rod (not shown) that extends to the center of the cover 12 where it is manipulated either by rotation of a key or energization of an electronic actuator. The electronic actuator can in turn be triggered by a remote sending unit. The cam lever lifts the cover to provide clearance between the rear edge 23 of the cover and the tailgate 82 (FIG. 3) to make it easier to grasp and lift the cover and allow the gas struts to take over.

While a particular form of the invention has been illustrated and described, it will be apparent to those skilled in the art that various modifications can be made without departing from the spirit and scope of the invention. More particularly, the lengths of the hinge links and the positioning of the link pivot points may be altered to adapt a particular cover configuration to a particular pick-up truck. Additionally, each of the hinge pockets, gas struts and strike loops may be attached to the cargo box by any various means. The locking mechanism may alternatively employ a single, centrally located latching element and strike loop combination while the mechanism may be unlocked by any of various remote actuated systems. Accordingly, it is not intended that the invention be limited except by the appended claims.

What is claimed is:

1. A system for hinging a hard tonneau cover to a pickup truck cargo box, comprising a compound hinge wherein multiple links extend between a first hinge plate and a second hinge plate, wherein said second hinge plate is attached to said cover and wherein said first hinge plate is slidingly received in a hinge pocket that is in turn attached to said cargo box.

2. The system of claim 1, wherein said hinge pocket comprises a plate having front and rear edges formed to define grooves for receiving front and rear edges of said first hinge plate and a bottom edge formed for engaging said first hinge plate upon full insertion into said hinge pocket.

3. The system of claim 2, wherein said first hinge plate is secured to said hinge pocket by a set knob.

4. The system of claim 3, wherein said first hinge plate has a hole formed therein that becomes aligned with a threaded boss formed in said hinge pocket upon full insertion of said first hinge plate into said hinge pocket to allow said set knob to be extended through said hole and threaded into said boss.

5. The system of claim 2, wherein said front and rear edges of said first hinge plate and of said hinge pocket are non-parallel.

6. The system of claim 5, wherein said first hinge plate and said hinge pocket have a generally trapezoidal shape.

7. The system of claim 2, wherein said hinge pocket is rigidly affixed to a siderail bracket that extends along a siderail of said cargo box and is attached thereto.

8. The system of claim 7, wherein said siderail bracket additionally has a telescoping gas strut and a strike loop for a locking mechanism attached thereto.

9. A hard tonneau cover for a pickup truck cargo box, comprising, a hinging mechanism that includes a compound hinge wherein multiple links extend between a first hinge plate and a second hinge plate, wherein said second hinge plate is attached to said cover and wherein said first hinge plate is slidingly received in a hinge pocket that is in turn attached to said cargo box;

a locking mechanism that includes a latching element that is attached to the cover and that engages a strike loop that is attached to said cargo box and includes a biasing element for lifting said latch element off of said strike loop upon being unlocked; and a telescoping gas strut that is attached to the cover at one end and detachably connected to the cargo box at its opposite end.

10. The cover of claim 9, wherein said biasing element comprises a spring-loaded cam lever that bears directly on said strike loop.

11. The cover of claim 10, wherein said hinge pocket, said strike loop and said telescoping strut are all attached to a toprail bracket that extends along a top rail of said cargo box and is attached thereto.

12. The cover of claim 9, further comprising a retention clip for retaining a free end of said telescoping strut against said cover upon detachment from said cargo box.

* * * * *